(12) United States Patent
Remor et al.

(10) Patent No.: US 10,078,020 B2
(45) Date of Patent: Sep. 18, 2018

(54) METHODS AND APPARATUS TO DETERMINE HOME APPLIANCE CABINET TEMPERATURE USING A LIGHT EMITTING DIODE (LED)

(71) Applicant: Whirlpool Corporation, Benton Harbor, MI (US)

(72) Inventors: Jose Paulo Remor, Stevensville, MI (US); Joao Eduardo Santana-Borges, Joinville (BR)

(73) Assignee: Whirlpool Corporation, Benton Harbor, MI (US)

( * ) Notice: Subject to any disclaimer, the term of this patent is extended or adjusted under 35 U.S.C. 154(b) by 840 days.

(21) Appl. No.: 13/974,586

(22) Filed: Aug. 23, 2013

(65) Prior Publication Data
US 2015/0055680 A1 Feb. 26, 2015

(51) Int. Cl.
| G01K 1/08 | (2006.01) |
| G01K 13/00 | (2006.01) |
| F25D 27/00 | (2006.01) |
| G01K 7/01 | (2006.01) |
| F24C 15/00 | (2006.01) |

(52) U.S. Cl.
CPC ............ *G01K 13/00* (2013.01); *F24C 15/008* (2013.01); *F25D 27/005* (2013.01); *G01K 7/01* (2013.01); *F25D 2700/12* (2013.01); *F25D 2700/123* (2013.01); *G01K 2207/02* (2013.01)

(58) Field of Classification Search
None
See application file for complete search history.

(56) References Cited

U.S. PATENT DOCUMENTS

| 4,529,949 | A | | 7/1985 | De Wit et al. |
| 5,187,941 | A | * | 2/1993 | Tershak ................ F25D 17/065 62/158 |
| 5,216,893 | A | * | 6/1993 | Santacatterina ........ F25B 49/02 236/94 |
| 6,400,101 | B1 | * | 6/2002 | Biebl ................ H05B 33/0818 315/185 R |
| 7,286,123 | B2 | | 10/2007 | Yang |

(Continued)

FOREIGN PATENT DOCUMENTS

| CN | 102135246 A | 7/2011 |
| DE | 102008039530 A1 | 2/2010 |

(Continued)

OTHER PUBLICATIONS

Use Forward Voltage Drop to Measure Junction Temperature Jason Chonko | Dec 14, 2005—http://www.electronicdesign.com/lighting/use-forward-voltage-drop-measure-junction-temperature.*
European Patent Application No. 14162476.7 filed Mar. 28, 2014, Applicant: Whirlpool Corporation, European Extended Search Report re: same, dated Mar. 26, 2015.

*Primary Examiner* — Erica Lin
(74) *Attorney, Agent, or Firm* — Nyemaster Goode, P.C.

(57) ABSTRACT

Methods and apparatus to determine home appliance cabinet temperatures using light emitting diodes (LEDs) are disclosed. An example home appliance includes a cabinet, a lighting system disposed in the cabinet having one or more LEDs to provide lighting in the interior of the cabinet, and a circuit electrically coupled to the lighting system and programmed to determine a temperature inside the cabinet based on a characteristic of the one or more LEDs of the lighting system.

8 Claims, 3 Drawing Sheets

(56) References Cited

U.S. PATENT DOCUMENTS

| | | | |
|---|---|---|---|
| 7,443,894 B2 | 10/2008 | Riddle et al. | |
| 7,635,957 B2 | 12/2009 | Tripathi et al. | |
| 7,663,326 B2 | 2/2010 | Santo et al. | |
| 8,075,182 B2 | 12/2011 | Dai et al. | |
| 8,264,171 B1 * | 9/2012 | Domer | H05B 33/0854 |
| | | | 315/291 |
| 8,283,876 B2 | 10/2012 | Ji | |
| 8,304,785 B2 | 11/2012 | Shih et al. | |
| 8,760,075 B1 * | 6/2014 | Tischler | H05B 33/0815 |
| | | | 315/185 S |
| 2005/0082553 A1 * | 4/2005 | Yamamoto | H05B 33/0887 |
| | | | 257/83 |
| 2010/0176746 A1 | 7/2010 | Catalano et al. | |
| 2010/0181507 A1 * | 7/2010 | Maruyama | H04N 1/02815 |
| | | | 250/552 |
| 2010/0236269 A1 * | 9/2010 | Mamemoto | A23B 7/0425 |
| | | | 62/331 |
| 2011/0031903 A1 | 3/2011 | Nguyen | |
| 2011/0252984 A1 | 10/2011 | Chung et al. | |
| 2012/0098430 A1 * | 4/2012 | Inoue | H05B 33/0893 |
| | | | 315/82 |

FOREIGN PATENT DOCUMENTS

| | | | |
|---|---|---|---|
| EP | 2444764 A1 | | 4/2012 |
| GB | 2369437 A | | 5/2002 |
| JP | 2007095391 A | | 4/2007 |
| JP | 2008089279 A | * | 4/2008 |
| KR | 20060081902 A | | 7/2006 |
| KR | 100643209 B1 | | 10/2006 |
| KR | 20110062280 A | | 6/2011 |

* cited by examiner

METHODS AND APPARATUS TO DETERMINE HOME APPLIANCE CABINET TEMPERATURE USING A LIGHT EMITTING DIODE (LED)

FIELD OF THE DISCLOSURE

This disclosure relates generally to home appliances, and, more particularly, to methods and apparatus to determine home appliance cabinet temperatures using light emitting diodes (LEDs).

BACKGROUND

Many home appliances utilize thermistors to determine home appliance cabinet temperatures. Such thermistors measure temperature at only one place in a cabinet and require the use of a separate wiring harness.

SUMMARY

Methods and apparatus to determine home appliance cabinet temperatures using LEDs are disclosed. An example home appliance includes a cabinet, a lighting system disposed in the cabinet having one or more LEDs to provide lighting in the interior of the cabinet, and a circuit electrically coupled to the lighting system and programmed to determine a temperature inside the cabinet based on a characteristic of the one or more LEDs of the lighting system.

An example method of determining a temperature inside a cabinet of a home appliance, the method includes activating a lighting system disposed in the cabinet having one or more LEDs, measuring a characteristic of the one or more LEDs while the lighting system is activated, and determining the temperature inside the cabinet based on the measured characteristic.

DETAILED DESCRIPTION

Figure 1:
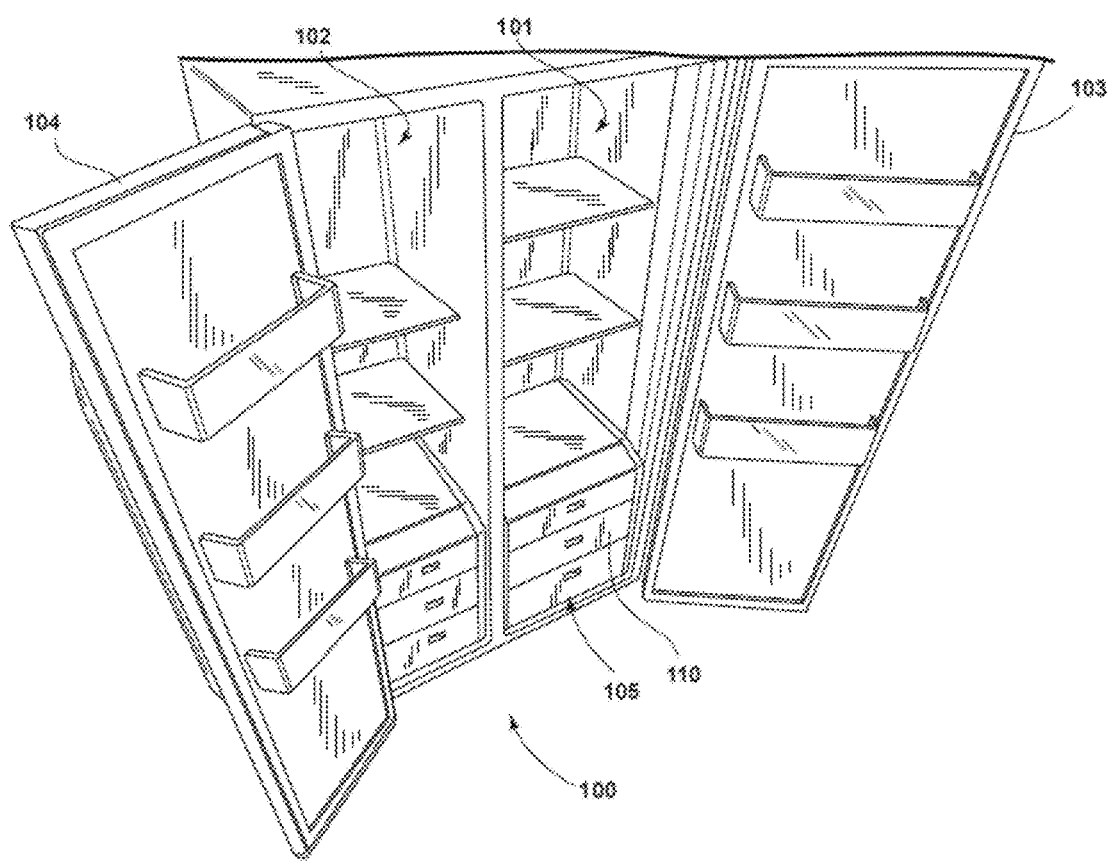
FIG. 1 is a perspective drawing of an example refrigerator that uses one or more LEDs to determine cabinet temperature.

FIG. 1 illustrates an example refrigerator 100 having a refrigerated cabinet or compartment 101 and a freezer cabinet or compartment 102. The refrigerated cabinet 101 and the freezer cabinet 102 each have an open face to provide access to the cabinets 101 and 102. The refrigerator 100 includes doors 103 and 104 moveably mounted to the refrigerator 100 for movement between opened and closed positions to selectively open and close the open faces of the cabinets 101 and 102. To allow food to be stored at different humidities and/or temperatures, the example refrigerator 100 includes a refrigerator drawer stack 105 having one or more refrigerator drawers (one of which is designated at reference numeral 110).

While not shown in FIG. 1, the example refrigerator 100 has a lighting system 205 (FIG. 2) inside each of the cabinets 101 and 102. The lighting systems 205 comprise one or more LEDs connected in series and distributed about the cabinets 101 and 102 to illuminate the interior of the cabinets 101 and 102.

While the example refrigerator 100 shown in FIG. 1 is a side-by-side refrigerator, it should be appreciated that the methods and apparatus to determine cabinet temperatures using LEDs disclosed herein are applicable to other refrigerators having other configurations, dishwashers, ovens, dyers, washer/dryer combos, or any other home appliance for which the determination of cabinet temperature is desired.

Figure 2:
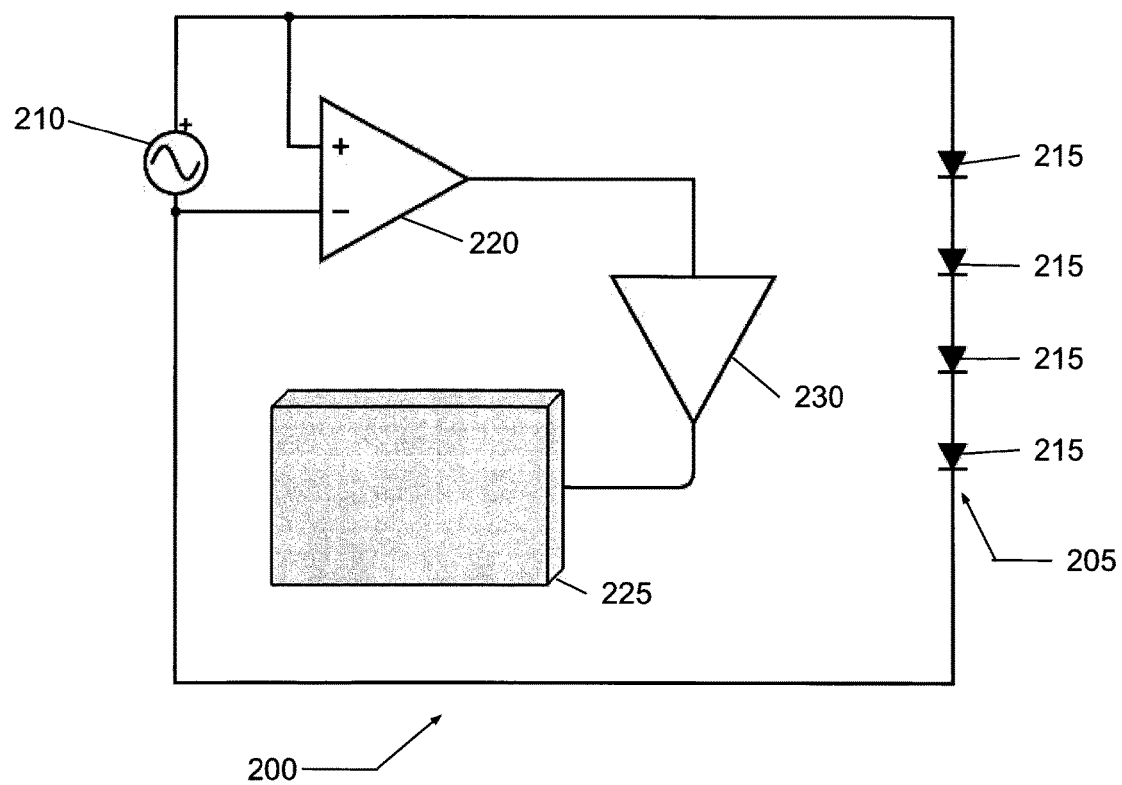
FIG. 2 is a schematic diagram of a circuit that may be used to determine cabinet temperature based on a measured characteristic of one or more LEDs.

Referring to FIG. 2, to activate the lighting system 205, the example circuit 200 of FIG. 2 includes a current source 210. The example current source 210 of FIG. 2 provides a current I that flows through the lighting system 205 causing LEDs (one of which is designated at reference numeral 215) of the lighting system 205 to emit light.

To measure the voltage $V_D$ across the lighting system 205, the example circuit 200 of FIG. 2 includes an amplifier 220. The example amplifier 220 of FIG. 2 generates a voltage $V_o$ that represents the voltage $V_D$ across the lighting system 205.

To determine an ambient temperature in which the lighting system 205 is operating (that is, the temperature inside a home appliance cabinet), the example circuit 200 of FIG. 2 includes a processor 225. Based on at least the amount of current I provided by the current source 210 and the voltage $V_D$, the example processor 225 of FIG. 2 determines the temperature inside a home appliance cabinet. The processor 225 determines the cabinet interior temperature using the following mathematical expression:

$$I = I_S\left(e^{V_D/nNV_T} - 1\right),$$

where I is the amount of current output the current source 210, $I_S$ is the reverse bias current or saturation current of the diodes 215, $V_D$ is the voltage across the LEDs 215, $V_T$ is the thermal voltage of the LEDs 215, n is the ideality factor, which is also known as the quality factor of sometimes the emissions coefficient, and N is the number of diodes 215. Knowing I and $V_D$, the processor 225 can use the equation above to solve for the voltage $V_T$ which can be used to lookup the temperature in which the diodes 215 are operating.

To convert the voltage $V_o$ to a digital value that may be processed by the processor 225, the example processor 225 of FIG. 2 includes an analog-to-digital converter 230. Alternatively, the analog-to-digital converter may be external to the processor 225.

Because the diodes 215 are distributed through a home appliance cabinet, the voltage $V_T$ represents an average of the temperature at each of the diode locations. Thus the methods and apparatus disclosed herein give a more accurate home appliance cabinet temperature than a single thermistor, which may suffer from a localized temperature variation. Moreover, instead of requiring a separate wiring harness to read values from a thermistor, the example circuit 200 of FIG. 2 only requires the addition of the amplifier 220, which can be situated locally to the current source 210 and processor 225.

Figure 3:
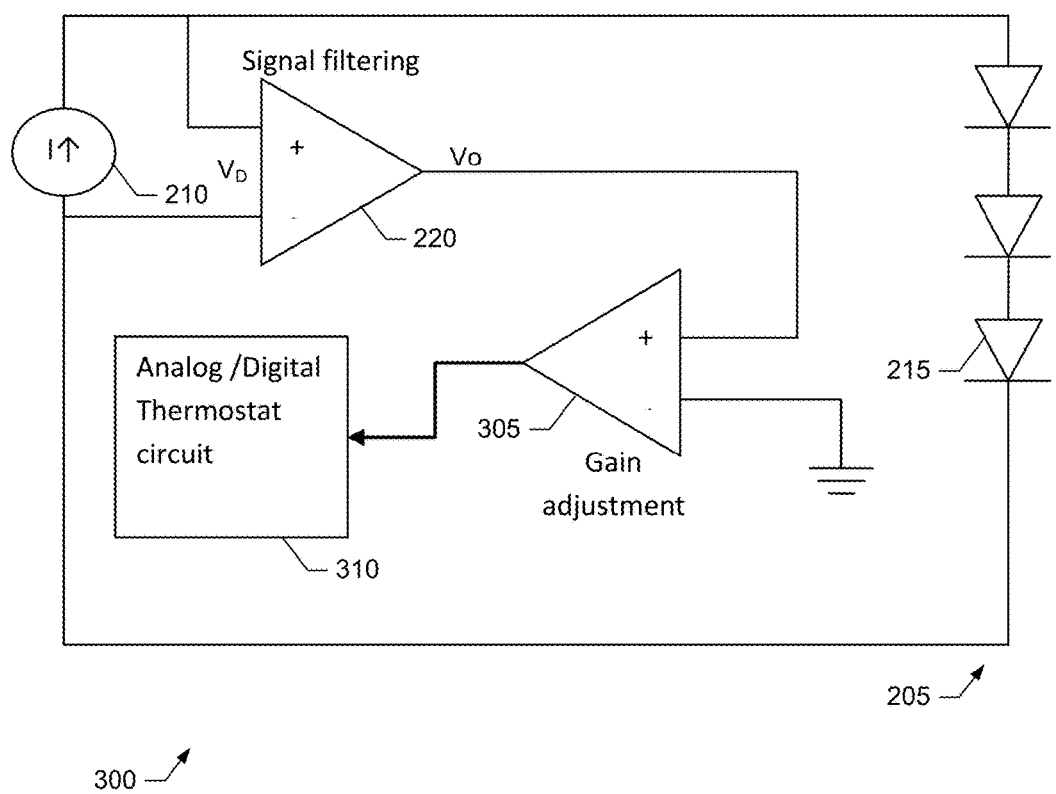
FIG. 3 is a schematic diagram of another circuit that may be used to determine cabinet temperature based on a measured characteristic of one or more LEDs.

Referring to FIG. 3, because portions of the example circuit of FIG. 3 are identical to those discussed above in connection with FIG. 2, the description of such portions is not repeated here. Instead, identical elements are illustrated with identical reference numerals in FIGS. 2 and 3, and the interested reader is referred back to the descriptions presented above in connection with FIG. 2 for a complete description of those like numbered elements.

To translate the voltage $V_o$ into a temperature, the example circuit 300 of FIG. 3 includes a gain adjustment 305 and an analog and/or digital thermostat circuit 310. The analog and/or digital thermostat circuit 310 implements substantially the same functionality as the processor 225 described above. However, instead of using a programmable processor, the functionality is implemented by a discrete circuit.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A refrigerator comprising:
    a cabinet;
    a lighting system disposed in the cabinet having a plurality of light emitting diodes (LEDs) distributed in series about the cabinet and lighting the interior of the cabinet;
    a current source in electrical communication with the plurality of light emitting diodes, the current source generating an input voltage;
    an amplifier electrically connected to the current source in parallel with the plurality of diodes, the amplifier configured to amplify the input voltage from the current source to an output voltage;
    a programmed circuit comprising a processor electrically coupled to the amplifier that calculates an average temperature inside the cabinet as a function of the output voltage from the amplifier.

2. The refrigerator of claim 1 further comprising an analog-to-digital converter electrically connected between the amplifier and the programmed circuit.

3. The refrigerator of claim 2, wherein the analog-to-digital converter is integral to the processor.

4. The refrigerator of claim 1, wherein the circuit comprises a programmable processor.

5. A method of determining an average temperature inside a home appliance, the method comprising the steps of:
    locating a plurality of light emitting diodes (LEDs) about an interior of a refrigerator compartment, wherein the LEDs are connected to one another in series;
    activating the LEDs disposed in the refrigerator compartment by activating a current source electrically connected to the LEDs;
    amplifying a voltage measured across the plurality of LEDs by an amplifier electrically connected to the current source, the amplifier being connected electrically in parallel with the plurality of LEDs;
    measuring the amplified voltage signal from the amplifier at a processor; and
    calculating the average temperature inside the interior of the refrigerator compartment as a function of the measured amplified voltage from the amplifier.

6. The method of claim 5 further comprising the step of converting the amplified voltage signal from an analog signal to a digital signal using an analog-to-digital converter electrically connected between the amplifier and the processor.

7. The method of claim 6, wherein the analog-to-digital converter is integral to a programmable processor.

8. The refrigerator of claim 1, wherein the lighting system is disposed in a freezer compartment of the refrigerator.

* * * * *